UNITED STATES PATENT OFFICE 2,671,806

PURIFICATION OF CHLORTETRACYCLINE

Robert Winterbottom, Pearl River, Peter Eichler, Congers, and Charles Pidacks, Spring Valley, N. Y., assignors to American Cyanamid Company, New York, N. Y., a corporation of Maine No Drawing. Application February 2, 1950, Serial No. 142,074

18 Claims. (Cl. 260—559)

Our invention relates to a process for the purification of the drug known as "chlortetracycline" and has for its general object an improvement over the previous methods of preparing the same, whereby an improved yield of therapeutically useful forms of the chlortetracycline may be recovered.

Our method is particularly useful in converting amorphous forms of chlortetracycline to comparatively pure crystalline forms. The method is also useful in improving the purity of crude crystalline chlortetracycline. As a result, the chlortetracycline has better appearances, is more acceptable from a therapeutic point of view, and additionally, the products are more stable, particularly towards heat. The more highly purified products are more desirable for therapeutic purposes because extraneous materials which may be present in some cases cause undesired physiological side reactions.

Chlortetracycline is produced and sold under the commercial designation "Aureomycin," which, in certain countries, is a trade-mark of the American Cyanamid Company. Chlortetracycline has been found to be a naphthacene derivative and while having a structure which strongly suggests tautomeric forms, is believed to exist with the following probable structure:

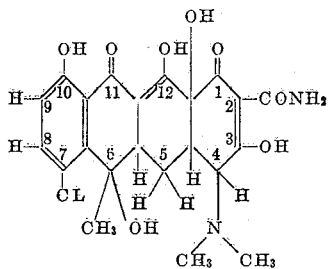

A numbering system is shown. The name under which the compound is indexed in Chemical Abstracts is: 7-chloro-4-dimethylamino-1,4,4a, 5,5a,6,11,12a-octahydro - 3,6,10,12,12a - pentahydroxy-6-methyl-1,11-dioxo - 2 - naphthacenecarboxamide [Chemical Abstracts, vol. 46, page 13363 (1952)]. Other numbering systems have been used in other U. S. patents, such as 2,658,077, and elsewhere. The accepted generic term for the compound is chlortetracycline (sometimes spelled "chlorotetracycline").

Chlortetracycline is a very unusual antibiotic in that it is amphoteric, having both acidic and basic groups in its molecule, and accordingly at times acts as an acid, and at times acts as a base. Accordingly, methods previously used to purify acid or basic antibiotics are not generally useful for chlortetracycline. Additionally, it has certain very special properties because there is a tendency towards partial polymerization or rearrangements which inactivate the chlortetracycline unless it is treated particularly gently.

Whereas chlortetracycline has been produced in therapeutically satisfactory forms by ordinary methods of crystallization and recrystallization from solvents, it is found that the yields are comparatively poor so that these methods if employed commercially increase markedly the cost of the therapeutically pure chlortetracycline. Chromatographic adsorption will yield a satisfactory product, but from a commercial standpoint, chromatographic adsorption is much more cumbersome and expensive than is our new process.

Because of the unstable and amphoteric properties of chlortetracycline, it has been necessary to use an entirely different concept of purification than has ever been previously known in the study of antibiotics. Additionally, certain of the impurities have a tendency to remain with the chlortetracycline when using ordinary methods of crystallization; but by purification in accordance with the procedures of our invention, it is possible to obtain high yields of therapeutically pure material; obtaining the chlortetracycline as the neutral chlortetracycline, as a salt with an acid, for example, a hydrochoride salt, or as a salt with a base, for example, a sodium salt—each of which has particular advantages for therapeutic use, depending upon the condition to be treated, the mode of administration, etc.

An object of this invention is to prepare the chlortetracycline in a therapeutically effective form with the largest practical yield, in as cheap and efficient a manner as possible. Furthermore, it is an object of this invention to prepare the salts, or the neutral chlortetracycline, which may be desired for a particular medical treatment, with the least expensive and troublesome modification of the purification procedure. By following the purification procedures of this invention, it is possible for the preliminary steps, solution, filtration, and so on, to be carried out under identical conditions, independent of the desired final product form, and the conversion to the desired final form be accomplished shortly before the final isolation of the purified material, so that a major process modification is not necessary to obtain the particular form of chlortetracycline which may be then desired.

At the present time, chlortetracycline hydrochloride, the salt of chlortetracycline with hydrochloric acid, is the form of chlortetracycline generally preferred by the medical profession. However, neutral chlortetracycline and the sodium salt are also highly satisfactory for therapeutic use and may be obtained in crystalline form of high purity by the process of the present invention.

Other salts of chlortetracycline with bases such as the potassium salt, etc., are all easily prepared through the use of our process, and where conditions justify, or under circumstances where the medical profession prefers them, such salts are easily made by following the procedures taught by this invention, and are included within its scope. Likewise salts of chlortetracycline with various acids, including sulfuric, phosphoric, hydrobromic, acetic, and the like may be prepared by the use of our process.

Where grown in suitable media under proper conditions, chlortetracycline is produced by the organism, Streptomyces aureofaciens. It is an antibiotic having an unusually great therapeutic range. Certain methods of its preparation are set forth in an application of Benjamin M. Duggar, Patent No. 2,482,055, dated September 13, 1949. Additional information on both the growing organism and the preparation of chlortetracycline and its therapeutic utilization are disclosed in the Annals of the New York Academy of Science, volume 51, article 2, November 30, 1948. Many articles in the current medical literature contain references to certain remarkable results obtained by the use of this potent antibiotic.

In accordance with the growing trend in the medical profession, the term "chlortetracycline" as herein used, is intended to denote and cover chlortetracycline in the neutral form, as well as the salts with acids and the salts with bases. The specific forms herein referred to will be indicated by a term to denote which form is being considered at the specific location.

In the past, chlortetracycline has been processed in aqueous solution, and has been extracted therefrom by the use of suitable solvents and recovered from the solvent by evaporation of the solvent, etc. However, in accordance with our invention, we have discovered that the product may be crystallized from solvents by suspending the chlortetracycline in the solvent and causing it to dissolve by shifting the pH to an appropriate point. The alkali bases, such as sodium hydroxide, potassium hydroxide, etc., are very satisfactory for pH control of acidic salts, or the neutral chlortetracycline; but because of the necessity for accurate pH control, and the fact that these bases are so strong, it is readily possible to obtain local over-alkalinization, or to run the pH over too far on the alkaline side, which may cause decomposition of the chlortetracycline. It is therefore preferable to use weaker bases, namely the nitrogenous bases, such as ammonia or the various amines. These materials, triethylamine for example, are readily obtainable, are cheap, and may be rapidly and easily added without the possibility of local over-alkalinization, or without the necessity for careful and tedious watching of the pH of the solution, to prevent running the pH to either too low or too high a point. It might almost be considered as a self-buffering action to preserve the alkalinity within the ranges which are considered most desirable, for the purposes of this invention.

A great many of the impurities naturally present at the time of the original formation of chlortetracycline will be found to be comparatively insoluble in this alkalinized solution and may be removed by filtration; and many materials, particularly the color bodies present, may be adsorbed upon a charcoal or diatomaceous earth which may be present. An activated charcoal, such as Darco G-60, is found to be very satisfactory. From this alkalinized solution, the chlortetracycline may be recovered in the desired form by altering the system characteristics.

To obtain an acid salt, sufficient of the desired acid is added to shift the pH to the range of less than about 3. To obtain the neutral chlortetracycline, the preferred range is between about a pH of 5 and a pH of about 7.5 with a pH of about 6 giving particularly effective results. To obtain the chlortetracycline as an alkali metal salt such as, for example, the sodium or potassium salts, the chlortetracycline may be recovered from the solution as formed within the range of about 8 to 10. The chlortetracycline in the desired form is caused to become insoluble by the shift in the pH, combined with a change in the solvent system and the temperature. Within the range of pH between about 3 and 5 a mixture of the acid salt and neutral chlortetracycline is obtainable. In the range of about 7.5 to 8 a mixture of neutral chlortetracycline and the alkali metal salt is obtained. These ranges may be used if mixtures are desired, or the mixtures may be separated by partial crystallization. Naturally, the purity of the final product depends in part upon the purity of the starting material and the degree of elegance of the methods used to form the starting material. In general, while the purity of the final product may vary to some extent, it is of a far higher standard than can be commercially obtained by other methods.

The concentrations depend in part upon the solvents which are chosen. Among the polar solvents which are suitable are such solvents as methyl alcohol, ethyl alcohol, higher alcohols, 2-methoxyethanol, 2 - ethoxyethanol, (alkoxyalkanols) ethylenechlorhydrin, dioxane, carbitol, ethylene glycol, benzyl alcohol, nitromethane, acetonitrile, propylenechlorhydrin, di-acetone alcohol, acetophenone, 2-methoxyethyl acetate, and water, and mixtures of two or more of these solvents. The lower alkoxyalkanols and lower alcohols are generally preferred because the chlortetracycline has better solubility characteristics therein, being relatively more soluble on the basic side and less soluble on the acid side. Methyl alcohol and 2-methoxyethanol and 2-ethoxyethanol are particularly effective as they are readily obtainable commercially, are comparatively inexpensive, and give a highly satisfactory operating range. If for any reasons these lower members are unavailable, or for other commercial reasons others are desirable, the higher members may be very effectively used. Ethyl alcohol and methyl carbitol are among the solvents which are very effective, although somewhat more expensive. A littel water in these solvents, within the limits of miscibility, is normally satisfactory, and with ethanol or dioxane, is actually quite useful, particularly for the recovery of acid salts. It is usually desirable that a minimum of water be present if the neutral chlortetracycline is to be recovered. Excellent yields of neutral chlortetracycline are obtainable by the use of anhydrous methanol or ethylenechlorhydrin. Purer products are usually obtained with less loss by the use of the organic solvents than with water alone as the solvent. Inactivation of the chlortetracycline is usually less with less water present, particularly at the higher temperatures or at the more alkaline ranges.

Solubilities are among the most obscure of all known properties of a material. It is frequently found that, for no apparent reason, slight changes in the structure of the product or of the solvent will cause large changes in the relative solubilities. It is particularly surprising that, particularly with the mono-amines, and other nitrogenous bases such as ammonia, to neutralize the acid group on the chlortetracycline and the acidic radical of any salt which may be present, the solubility of the chlortetracycline in hydroxylated and ethereal organic solvents is increased to such a remarkable extent. However, it is not a sharp phenomenon, and the amounts of ammonia or amines to solubilize, and the exact pH's, vary to some extent with the concentration and solvent which is being used.

The neutral chlortetracycline may be used as the starting material rather than an acid salt, in which case a smaller quantity of the base is required for effective solubilization. The quantity of base to be used may either be on a calculated basis from the purity and quantity of chlortetracycline which is being used, or it may be by an actual measurement of the pH involved. For the determination of pH of non-aqueous solutions, the term pH in and of itself, to a large extent loses its significance; but as a practical operating value, it is found that by diluting an equal volume of a solvent with water and then measuring the pH of the aqueous layer, if immiscible, or the mixture, if miscible, with a standard glass electrode, there is obtained a reading of pH, or acidity and basicity, which is in effect a very useful figure, even though it may not exactly come within the scope of the classic definition of that which is meant by pH as originally defined. For the purposes of this invention, where a non-aqueous solvent is being used, the figure obtained in this manner is referred to as the pH of the solution.

The amines are more desirable than the metallic alkalis. It is desirable that a non-toxic amine be used, and preferably one of low molecular weight and low cost so that the expense involved will be a minimum, the quantity will be a minimum, and the necessity for a thorough removal of the amine will be at a minimum. Of course, by suitable precautions any of these factors may be neglected if considered desirable for a specific set of conditions. Ammonia is, of course, considered the first member of the family of amines, or nitrogenous bases, in which none of the hydrogens are substituted by organic radicals; and because of this fact a lesser quantity may be used for neutralization. Additionally, ammonia is comparatively non-toxic, and if ammonia is permitted to remain in the form of an ammonium halide, it is a harmless diluent in the final chlortetracycline which is recovered, which may very well be a hydrohalide.

Triethylamine is particularly useful because it is readily obtainable commercially, it is of a comparatively low molecular weight, and is in general highly useful as it causes rapid solubilization and is easily manipulated. Other amines, such as diethylamine, tri-n-butylamine, cyclohexylamine, morpholine, di-n-propylamine, beta-phenylethylamine, ethanolamine, isoamylamine, and ethyl morpholine, dimethylbenzylamine, 2-aminopyridine, isobutylamine, dicyclohexylamine, diethanolamine, triethanolamine, beta-di-ethylaminoethanol, and trimethylamine, and mixtures of any of the suitable bases give satisfactory results, although their recovery cost or scarcity renders them less desirable from a commercial standpoint.

In general, the amines which have an ionization constant of $10^{-7}$ or stronger (as bases) are satisfactory. Those with an ionization constant of $10^{-6}$ or stronger, are better because they operate more rapidly and insure greater solubility.

It is desirable that the solution be fairly close to neutral because chlortetracycline is subject to decomposition if it is permitted to become too basic, particularly in the presence of water, or when hot. With ammonia, or triethylamine, etc., the natural weaknesses of the base serves to prevent the solution from becoming too basic, even locally, during the preliminary mixing. Even with these, losses are reduced if the mixture is kept cool, e. g. 5° C. while on the alkaline side during processing.

The chlortetracycline, which may be either as a free base or any of its acid salts or a metallic salt, is normally most conveniently suspended in the solvent as a slurry, and thereto added the base with stirring, whereby the chlortetracycline is converted to its soluble form on the alkaline side, although of course, other orders of addition or mixing may be used.

The insoluble impurities which are usually present, unless unusual precautions had been previously taken to obtain their removal, may then be removed by filtration or other means. Color impurities which are present are removable with a decolorizing carbon or filter-aid which may be added at this time.

After the removal of the impurities, the chlortetracycline is separated from the clarified solution as the desired form. This may also be conveniently done at room temperature, although if the material is to remain for any length of time, it is desirable that it be fairly cool to prevent the chlortetracycline from decomposing, particularly if the material is in the more alkaline of the above-mentioned range. From this solution of the chlortetracycline, the material desired may be recovered in three forms.

The most sought presently is the acid salt, particularly the hydrochloride. The chlortetracycline may be separated from its solution as the hydrochloride by the addition of sufficient hydrochloric acid to this clarified solution to cause the formation of chlortetracycline hydrochloride. Sufficient hydrochloric acid may be added on a calculated basis, or more conveniently, sufficient hydrochloric acid added to raise the acidity by lowering the pH to less than about 3. A value of 0.8 is particularly satisfactory. The chlortetracycline is then present as the chlortetracycline hydrochloride which crystallizes out. If water itself is used as a solvent, the addition of the acid and cooling causes the material to become insoluble and come out as the crystals of chlortetracycline hydrochloride.

It is normally desirable that the material be allowed to stand for a reasonable length of time, in the neighborhood of 8 to 24 hours, to insure complete precipitation of the chlortetracycline as its hydrochloride. Because of its unusual characteristics, the chlortetracycline does not instantly come out as an insoluble salt, so better yields are obtained by some holding. Excess hydrochloric acid causes more rapid precipitation. Better yields of the hydrochloride salt are obtained by the use of organic solvents with a minimum of water present. Methanol, or one of the lower alkoxyalkanols gives particularly good yields of a pure product.

The other acid salts are obtainable similarly by the use of other acids.

For the recovery of neutral chlortetracycline, it is possible to add sufficient acid to lower the pH to within the neighborhood of 5 to 7, preferably about 6, at which point the neutral chlortetracycline is formed in the solution and may be separated therefrom. Whereas any of the solvents above mentioned may be used for the recovery of this neutral chlortetracycline, methanol and the cellosolves give solutions which, on partial neutralization so as to form the neutral chlortetracycline, causes the neutral chlortetracycline to come out in a form which is more readily separated from the solvent. With certain of the other solvents, there is more of a tendency for the formation of a gelatinous, or difficultly-filterable, precipitate.

For the recovery of the metallic salts, such as potassium or sodium, it is possible to, with the use of organic solvents, add water thereto and cause the chlortetracycline in the form of its sodium or potassium salt to become less soluble and precipitate out. For commercial yields however, it is normally preferred to use an organic solvent, such as methanol, for the recovery of the sodium or potassium salt, rather than water alone.

In the recovery, the acid used is normally hydrochloric, although other acids may be used and an aqueous solution of the acid may be conveniently used. Salts of acids other than the hydrochloric are obtained by the use of the respective acids; but therapeutically, the hydrohalide is preferred. The hydrohalide salts crystallize much more readily.

After the separation of the chlortetracycline in the form of the desired salt, it is convenient that it be washed to remove the solvent, and any impurities, in accordance with the usual crystallization procedures. The solvent need not be the same as that in which the chlortetracycline was originally dissolved; but to simplify the problems of solvent recovery, it is most convenient to use the same solvent. It is convenient to wash the crystals as recovered, first with the solvent with which they were originally formed; then with a small quantity of water; and then with alcohol, although the order is not important. Water tends to remove any salts which may be present, such as those of ammonia or the amines which may have been formed simultaneously with the desired salt of chlortetracycline. The material is then dried for use.

To better exemplify certain specific modifications of our invention, specific examples are herewith set forth.

Example 1

Two kilograms of a crude chlortetracycline hydrochloride were suspended in 8 liters of 2-ethoxyethanol at a temperature of 10° C. 940 milliliters (2 equivalents) of triethylamine were then added. Substantially complete solution resulted and the small volume of insoluble impurities was removed from the solution. The pH of this solution was 7.8; measured by diluting a small volume of the solution with an equal volume of water and measuring the pH of the resultant with a glass electrode. To the clear solution was added sufficient hydrochloric acid to lower the pH to 1.5, 1470 milliliters of 6 normal acid being required. After standing for four hours at room temperature and overnight in a refrigerator at 4° C. (15 hours) the crystal slurry was filtered, washed with 2-ethoxyethanol, water, and ethyl alcohol, and dried in vacuo. A yield of 1.54 kilograms of bright yellow crystals was thereby obtained. The potency of the starting material was 850 gammas per milligram and the recrystallized product was 970 gammas per milligram. $(a)_D 20° = -240°$ (C=0.5% in water). The material analyzes:

| | Per cent |
|---|---|
| Carbon | 51.3 |
| Hydrogen | 4.9 |
| Nitrogen | 5.7 |
| Chlorine | 13.4 |

Example 2

A suspension was prepared of 100 grams of crude chlortetracycline hydrochloride with a potency of 790 gammas per milligram in 600 milliliters of anhydrous ethanol which was chilled to 4° C. and solution effected by the addition of 54.4 milliliters (2 equivalents) triethylamine. The insoluble impurities were removed by filtration and the clear filtrate acidified to a pH of 1.5 by the addition of 65.0 milliliters of 6 normal hydrochloric acid. The mixture was stirred for one hour and permitted to stand 5 hours at room temperature and 9 hours at 4° C., after which the crystals were filtered, washed twice with ethanol, once with water and dried. Thereby was obtained a yield of 65.5 grams of chlortetrocycline hydrochloride of a bright yellow crystalline nature assaying 995 gammas per milligram.

Example 3

A suspension was prepared of 25 grams of chlortetracycline hydrochloride in 150 milliliters of dry methanol. The mixture was chilled to 4° C. and thereto added 7 milliliters triethylamine slowly with stirring. After solution was substantially complete, a small amount of Hy-Flo Supercel was added as the filter-aid and the material filtered. To the clear filtrate was added a total of 12 milliliters of 6 normal hydrochloric acid which reduced the pH to 1.5 and caused the chlortetracycline to crystallize as the hydrochloride. The material was permitted to stand until crystallization was complete, the crystals were removed by filtration, washed once each with methanol, water, and anhydrous ethyl alcohol, then dried. A yield of 16.6 grams of chlortetracycline hydrochloride was obtained which assayed 944 gammas per milligram compared with an analysis of 820 gammas per milligram for the starting material.

Example 4

A suspension of 64.8 kilograms of crude chlortetracycline hydrochloride in 450 liters of anhydrous ethanol at 20° C. was prepared and solution effected by the addition of 32.5 liters of triethylamine. The pH of the solution measuring as set forth in the last example was 8.1. The solution was filtered to remove insoluble impurities, and the pH lowered to 2.5 by the addition of concentrated hydrochloric acid. The crystals started to form immediately. The mixture was stirred a few minutes every hour for 15 hours; the crystals thereby formed were filtered out, washed twice with ethanol, once with water and dried in a vacuum. A yield of 42.3 kilograms of chlortetracycline hydrochloride was obtained. The starting material assayed 885 gammas per milligram and the clear yellow product assayed 1030 gammas per milligram, both analyses being by the microbiological method.

*Example 5*

A stirred suspension of 15.0 grams of chlortetracycline hydrochloride in 60 cc. of 2-ethoxyethanol was treated with 9.8 cc. of di-n-butylamine. The resultant solution was filtered, then acidified with 13.5 cc. of 6 normal hydrochloric acid. The mixture was permitted to stand overnight in the chill room and the chlortetracycline hydrochloride separated therefrom. A yield of 11.6 grams of a light yellow clear product was obtained, assaying 1000 gammas per milligram.

*Example 6*

A stirred suspension of 15 grams of crude chlortetracycline hydrochloride and 66 cc. of 2-ethoxyethanol was treated with 5.3 cc. of ethanolamine. The resultant solution was filtered and the filtrate acidified with 13.5 cc. of 6 normal hydrochloric acid. A yield of 10.2 grams of a purified light yellow chlortetracycline hydrochloride was thereby obtained, assaying 990 gammas per milligram.

*Example 7*

A suspension of 25 grams of chlortetracycline hydrochloride assaying 850 gammas per milligram in 110 cc. of 2-ethoxyethanol was stirred and treated with 8.5 cc. of morpholine. After filtration to remove insoluble impurities the filtrate was acidified with concentrated hydrochloric acid to a pH of 0.8. After standing overnight at room temperature the crop of crystals yielding 17.5 grams of a fine light yellow chlortetracycline hydrochloride assaying 930 gammas per milligram was obtained.

*Example 8*

One gram of chlortetracycline hydrochloride was added to 10 cc. of 2-methoxyethanol. Thereto was added two equivalents (0.54 milliliter) of triethylamine, thereby forming a solution. The solution was filtered through a sintered glass filter to be sure that all insolubles were removed, and to the clear filtrate was added 0.77 milliliter of 6 normal hydrochloric acid. The mixture was stirred and cooled until crystallization was complete. (The mixture was left in an ice box for 24 hours to insure complete crystallization.) The crystals were separated and washed, first with 2-methoxyethanol, then with a small quantity of water to insure the removal of any triethylamine hydrochloride or other water-soluble impurities, and then with ethanol. A recovery of 73% based on the original quantity of chlortetracycline was obtained.

*Example 9*

Experiment 8 was repeated using methyl carbitol instead of 2-methoxyethanol. A yield of 49% was obtained.

*Example 10*

Experiment 8 was repeated using 1,4-dioxane instead of 2-methoxyethanol as the solvent. A yield of 46% was obtained.

*Example 11*

Experiment 8 was repeated using ethylene glycol instead of 2-methoxyethanol. A yield of 35% was obtained.

*Example 12*

Experiment 8 was repeated using benzyl alcohol instead of 2-methoxyethanol as the solvent. A yield of 70% was obtained.

*Example 13*

Experiment 8 was repeated using as a solvent dioxane to which 10% water had been added, which resulted in a yield of 40%.

*Example 14*

25 grams of chlortetracycline hydrochloride was added to a mixture of 100 milliliters of ethylenechlorhydrin and 6 milliliters of triethylamine (1 equivalent). The material was run through a sintered glass filter to remove any insolubles, and to the clear filtrate was added 10.6 milliliters of 6 normal hydrochloric acid. The mixture was cooled and the crystals separated therefrom, washed once with ethylenechlorhydrin and then with water and then with ethanol. Thereby was obtained a yield of 14 grams of chlortetracycline hydrochloride.

*Example 15*

8 milliliters of ethanol containing 10% added water had added thereto 1 gram of chlortetracycline as the free base. The pH was raised to between 7.5 and 8 by the addition of triethylamine. Thereto was added about ¼ gram of a decolorizing charcoal (Darco G-60) and the material filtered. The pH of the filtrate was lowered to 1.5 with 6 normal hydrochloric acid; it was stirred and chilled, filtered, and the crystals washed. Thereby was obtained a yield of 78.1% of chlortetracycline as the hydrochloride.

*Example 16*

1 gram of chlortetracycline free base was added to 4 milliliters of 2-ethoxyethanol and solution effected by adding sufficient triethylamine to raise the pH to between 7.5 and 8. Decolorizing charcoal was added, the material filtered and 6 normal hydrochloric acid was added to a pH of 1.5. The resultant was chilled, filtered, the crystals of chlortetracycline hydrochloride washed with 2-ethoxyethanol, then water, then ethanol. There was obtained a yield of 76.3%.

*Example 17*

A mixture was prepared of 25 grams of a crude chlortetracycline hydrochloride analyzing 870 micrograms per milligram, in 200 milliliters of ethanol, and thereto added 6.5 milliliters of 28% aqueous ammonia. The mixture was chilled to 10° C. and then the solution filtered to remove any insoluble impurities. To the solution was then added 8.1 milliliters of concentrated hydrochloric acid and permitted to age at room temperature for 28 hours. The crystals then present were filtered, washed once with 2-ethoxyethanol, once with water, then with alcohol, and dried in a vacuum. There was obtained a yield of 19.9 grams of purified chlortetracycline hydrochloride analyzing 988 micrograms per milligram.

*Example 18*

To 1 gram of amorphous chlortetracycline sulfate was added sufficient triethylamine to effect solution at a pH of 8 in 10 cc. of 2-ethoxyethanol. The mixture was stirred, filtered to insure clarity, and thereto added two equivalents of hydrochloric acid. The resultant precipitate of chlortetracycline hydrochloride was separated, washed once with 2-ethoxyethanol, then with water and then again with 2-ethoxyethanol, thereby obtaining a crystalline chlortetracycline as the hydrochloride.

*Example 19*

To 1 gram of chlortetracycline hydrochloride was added 10 cc. of 2-ethoxyethanol containing two equivalents of triethylamine. The mixture was stirred until solution was effected and any impurities removed by filtration. To the resulting clear solution was added hydrobromic acid to a pH of 1.5. The resultant chlortetracycline hydrobromide was separated by filtration, washed once with 2-methoxyethanol, then with water and then with ethyl alcohol.

*Example 20*

One gram of chlortetracycline hydrochloride had added thereto 0.54 milliliters of triethylamine and 10 cc. of ethanol, using alcohol sold commercially conforming to the 2B formula of the U. S. Bureau of Internal Revenue. The solution was clarified with the aid of 200 milligrams of decolorizing carbon, and thereto added 0.77 milliliter of 6 normal hydrochloric acid. The mixture was stirred and cooled, to cause more complete crystallization, after which the crystals were separated and washed, yielding 50% of a therapeutically acceptable chlortetracycline hydrochloride.

*Example 21*

25.9 grams of chlortetracycline hydrochloride were suspended in 250 milliliters of methanol, and solution effected by the addition of 10.5 milliliters of methanolic ammonia, containing 2 equivalents of ammonia, then filtered. The filtrate was acidified with 2 equivalents of methanolic hydrochloric acid. The crystals formed were separated, washed with water, then methanol, and dried. A yield of 17 grams of purified chlortetracycline hydrochloride was obtained.

*Example 22*

The preceding experiment was repeated, using gaseous ammonia instead of methanolic ammonia, care being used in its addition, and the results found to be substantially identical.

*Example 23*

25 grams of a chlortetracycline as the hydrochloride was dissolved in 100 cc. of water with the aid of 20.4 cc. of triethylamine. 2.5 grams of decolorizing carbon were added; the insolubles were removed, and thereto added 24.2 cc. of 6 normal hydrochloric acid. The mixture was stirred for 3 hours at room temperature and then chilled for 2 hours to insure complete precipitation. The crystals of chlortetracycline hydrochloride thereby formed were filtered from the solution, washed once with water, then with ethyl alcohol, and permitted to dry. There was obtained a yield of 15 grams of chlortetracycline analyzing 990 gammas per milliliter. The crystals were of a brown color.

*Example 24*

1 kilogram of crude chlortetracycline hydrochloride was suspended in 4 liters of 2-ethoxyethanol at a temperature of 10° C., and thereto added 2 equivalents of 28% aqueous ammonia raising the pH to approximately 7.8. The insoluble impurities were removed by a centrifuge and to the clear solution was added sufficient concentrated hydrochloric acid to lower the pH to 1.5. The mixture was stirred and allowed to stand overnight, then filtered, the crystals washed once with 2-ethoxyethanol, followed by a water wash, an ethyl alcohol wash, and then dried in vacuo. 812 grams of a bright yellow crystalline chlortetracycline hydrochloride were thereby obtained.

*Example 25*

100 grams of a crude chlortetracycline hydrochloride was slurried in 500 cc. of 2-ethoxyethanol. Thereto was added 35.8 cc. of 10.8 normal sodium hydroxide, and the mixture stirred until solution resulted. Any insoluble impurities were removed by filtration and to the clear filtrate was added 100 cc. of distilled water. The mixture was allowed to stand, with stirring, for ½ hour at room temperature, and then placed in a chill room overnight. An orange-yellow precipitate formed, which was filtered, washed twice with a 6:1 2-ethoxyethanol-water wash mixture, and once with anhydrous ethanol. The crystals thus formed were dried over phosphorus pentoxide, and thereby was obtained a yield of 62 grams of orange-yellow crystals of the sodium salt of chlortetracycline, assaying 890 micrograms per milligram, according to the standard assay. The sodium salt is hygroscopic and must be kept dry to prevent its picking up an undue quantity of water.

*Example 26*

60 grams of a comparatively dry sodium chlortetracycline, assaying 890 micrograms per milliliter, were slurried in 300 cc. of 2-ethoxyethanol. To the slurry was added 18.1 cc. of 6.8 normal hydrochloric acid, thereby resulting in a solution, which when diluted with an equal quantity of water, gave a pH of 6.75. To the 2-ethoxyethanol solution was added 600 cc. of distilled water, with stirring, over a period of 1 hour. The pH was found to be 7.7 and was adjusted to 7 with 3.0 cc. of the hydrochloric acid. The mixture was chilled for 2 hours, and the crystals formed removed by filtration and washed three times with water. The crystals were dried at room temperature over phosphorus pentoxide for 12 hours, and thereby was obtained a yield of 39.1 grams of neutral chlortetracycline, assaying 1100 micrograms per milligram. This is a recovery of 81% of the chlortetracycline activity.

*Example 27*

A suspension was prepared of 30 grams of crude chlortetracycline hydrochloride and 150 cc. of 2-ethoxyethanol. To this suspension was added sufficient of a 10 normal solution of sodium hydroxide to raise the pH to 8.5. The mixture was stirred rapidly, to prevent local over-alkalinization, and care was used to see to it that the entire amount of caustic was added within a short period. The solution was comparatively clear. Thereto was added 1 gram of decolorizing carbon, the mixture stirred, allowed to settle, and then filtered. Much of the color and many of the impurities were thereby removed.

To 50 cc. of this clear filtrate was added an equal volume of water, the mixture cooled with stirring, and allowed to stand overnight in a chilled chamber; and then the sodium salt of chlortetracycline which was thereby precipitated separated by filtration. The sodium salt was washed once with ethyl alcohol, then with ether, and dried. A pale, dry, yellow material was obtained.

Example 28

To a second 50 cc. portion of the filtrate, obtained in the preceding example, was added sufficient hydrochloric acid to lower the pH to 6.0. The mixture was stirred, and then there was added thereto 50 cc. of distilled water, and the mixture allowed to chill overnight in a refrigerator at 4° C. forming crystals. The thus crystallized neutral chlortetracycline was separated by filtration, washed once with water, once with ethyl alcohol, and then permitted to dry. A pale, yellowish, crystalline, neutral chlortetracycline was thereby obtained.

Example 29

To the third 50 cc. portion of the filtrate from Example 27 was added sufficient ethanolic hydrochloric acid to lower the pH to approximately 1.5. The mixture was allowed to stand overnight in a chilled room, and the crystals of chlortetracycline hydrochloride thereby obtained were separated, washed with anhydrous ethanol, and dried. A very pale yellow crystalline form of chlortetracycline hydrochloride was thereby obtained. A second crop of crystals of chlortetracycline hydrochloride was obtained by adding acid to a pH of 0.5 and permitting it to stand in a chill room for an additional 48 hours.

Example 30

50 grams of chlortetracycline, neutral, was suspended in 250 cc. of 2-ethoxyethanol. Sufficient 10 normal sodium hydroxide was added to raise the pH to 7.5. The mixture was warmed to about 40° C. to hasten solution. The solution was filtered from any insoluble impurities, and to the filtrate was added 250 cc. of water. The free base, or neutral chlortetracycline crystallized out rapidly. The long yellow needles of neutral chlortetracycline were removed by filtration, washed with 1:1 2-ethoxyethanol-water solution, then ethyl alcohol, then ether, and dried. A total of 35.3 grams of chlortetracycline were recovered as the neutral chlortetracycline with a potency of 950 micrograms per milligram.

Example 31

To 25 grams of chlortetracycline hydrochloride was added 200 milliliters of methanol and 6.4 milliliters of triethylamine, and the resulting mixture stirred to give a solution at a pH of 5.03. The insolubles were filtered off, and the filter washed with 25 milliliters of fresh methanol. To the solution was added 33 milliliters of water over a 15 minute period with constant stirring, and chlortetracycline, neutral, was thereby precipitated. Stirring was continued for an additional hour, and the material was kept at 4° C. overnight. The chlortetracycline, neutral, was filtered, washed twice with 25 milliliters of 85% methanol and dried in vacuo. A 90% recovery of chlortetracycline was obtained, calculated on the purity involved. The resulting material analyzed 1030 micrograms per milligram, using a starting material with an analysis of 850 micrograms per milligram.

Example 32

To 275 grams of chlortetracycline hydrochloride was added 2200 milliliters of anhydrous methanol, and 72 milliliters of triethylamine. The mixture was thoroughly stirred and found to have a pH of 5.3. The insoblues were removed by filtration and washed with 180 milliliters of methanol, the wash being added to the filtrate. The final volume of solution was 2540 milliliters. To this was added 20% by volume of distilled water, the mixture stirred, permitted to stand for 16 hours at 4° C., and the neutral chlortetracycline thereby precipitated was filtered, washed twice with 250 milliliters of 80% methanol and dried in vacuo. There was obtained a unit yield of 95% of the total chlortetracycline originally present, and the final material was found to analyze 970 micrograms per milligram.

Example 33

25 grams of crude chlortetracycline hydrochloride were slurried in 200 milliliters of methanol. The pH was adjusted to 5.71 with 6.0 milliliters of ethyl morpholine. The solution was filtered, and the filter pad washed with 25 milliliters of methanol. Chlortetracycline was precipitated by the addition of 30 milliliters of water with stirring. After standing for 16 hours, the chlortetracycline was filtered, washed twice with 20 milliliters of 80% methanol and dried in vacuo. There was obtained a yield of 87% of material analyzing 1010 micrograms per milligram of chlortetracycline, neutral. The weight of the product was 19.8 grams.

Example 34

The above experiment was repeated except that ethanolamine was used as the nitrogenous base, and there was obtained 18.7 grams of material analyzing 990 micrograms per milligram.

Example 35

The above experiment was repeated using beta-phenylethylamine as the nitrogenous base, and there was obtained a yield of 19.6 grams with purity of 905 micrograms per milligram.

Example 36

The above experiment was repeated using triethylamine as the nitrogenous base, and there was obtained a yield of 19.4 grams of material analyzing 1000 micrograms per milligram.

Example 37

A slurry was prepared containing 36 grams of crude chlortetracycline hydrochloride of a brownish color by suspending it in 180 milliliters of 2-ethoxyethanol, which was then made alkaline to a pH of 8.5 with 10 N sodium hydroxide. The solution was filtered and thereto added sufficient concentrated hydrochloric acid to lower the pH to 1.5, whereupon chlortetracycline hydrochloride separated out into crystalline form. The crystals were removed by filtration, washed with ethyl alcohol until the washings were comparatively colorless, then once with ether, and dried. There was obtained a yield of 28.0 grams of a very light yellow chlortetracycline hydrochloride.

Example 38

100 grams of chlortetracycline hydrochloride as an impure brown material was suspended in 500 milliliters of 2-methoxyethanol; and solution induced by the addition thereto of 30 milliliters of 10 N sodium hydroxide. The caustic was added with rapid stirring so that local over-alkalinization would not occur. Thereto was added 1 gram of a decolorizing carbon and the solution filtered. 25 milliliters of concentrated hydrochloric acid were added with stirring to the filtrate, the solution allowed to stand overnight in a chill room, and the crystals removed by filtration. The crystals were washed with 250 cc. of ethyl alcohol, then with ether, and dried. 80 grams of a light yellow chlortetracycline hydrochloride was thereby obtained.

Example 39

1 gram of chlortetracycline hydrochloride was suspended in 10 cc. of 2-methoxymethanol. The solution was made alkaline by the addition of sodium methylate in methanol to a pH of approximately 9, the solution filtered and 12 N hydrochloric acid added to a pH of 1.5. The solution was chilled overnight and the crystals of chlortetracycline hydrochloride were separated therefrom, washed with methanol, and dried.

Example 40

The above experiment was repeated using 2-butoxyethanol as the solvent. Crystallization was particularly rapid. The results were substantially identical.

Example 41

250 grams of chlortetracycline hydrochloride were suspended in 1250 milliliters of 2-ethoxyethanol, the suspension alkalinized to a pH of about 8 with 10 N sodium hydroxide and the resulting solution filtered. To the filtrate was added 250 cc. of water and 100 cc. of concentrated hydrochloric acid. The mixture was stirred rapidly, then allowed to cool in a chill room overnight, the crystals separated by filtration, then washed with ethyl alcohol, ether, and dried. There was obtained a yield of 222 grams or 88.8% of a pale yellow chlortetracycline hydrochloride.

Example 42

A suspension of 100 grams of crude chlortetracycline hydrochloride in 500 cc. of 2-ethoxyethanol was adjusted to a pH of 8.65 with 10 N potassium hydroxide. 3 grams of diatomaceous earth were added thereto, the solution stirred, then filtered, and the cake washed with a small volume of 2-ethoxyethanol. To the filtrate was added 100 milliliters of distilled water and the pH adjusted to 1.3 with 6 N hydrochloric acid; the crystals thus formed were aged overnight at 4° C., separated by filtration, then washed with 2-ethoxyethanol, water and anhydrous 2B alcohol. (2B alcohol is an ethyl alcohol to which 2% benzene has been added as a denaturant.) 81 grams of clear yellow crystals were obtained which assayed 1030 micrograms per milligram by the fluorometric method; the starting material assayed 930 micrograms per milligram by the same method.

Many obvious modifications, involving slight changes in temperatures, pressures, concentrates, etc., as well as minor mechanical modifications such as centrifugations or decantations instead of filtrations, etc., will suggest themselves to those skilled in the art.

Having thus set forth certain embodiments thereof, as our invention we claim:

1. A method for the purification of chlortetracycline which comprises dissolving a crude chlortetracycline and sufficient of a nitrogenous base to substantially neutralize and solubilize all of the chlortetracycline, in an hydroxylated organic solvent, separating any undissolved material and precipitating the chlortetracycline therefrom by the addition of a hydrohalide acid.

2. A method for the purification of chlortetracycline which comprises dissolving a crude chlortetracycline and a basic compound selected from the group consisting of ammonia, triethylamine, ethanolamine, di-n-butylamine and morpholine in a solvent selected from the group consisting of lower alkanols, lower-alkoxy-lower alkanols, methyl carbitol, ethylene chlorhydrin, propylene chlorhydrin, dioxane, ethylene glycol, benzyl alcohol, nitromethane, diacetone alcohol, acetophenone, and a lower fatty acid ester of a lower-alkoxy-lower-alkanol, separating any insoluble material, adding to the clarified solution a hydrohalide acid, whereby the chlortetracycline is recovered as a hydrohalide salt, and separating the thus formed chlortetracycline hydrohalide.

3. A method for the purification of chlortetracycline which comprises dissolving a crude chlortetracycline and a nitrogenous base having an ionization constant of $10^{-7}$ or greater in an organic solvent containing alcohol linkages, separating any insoluble material, precipitating the chlortetracycline in the desired form by the addition of an agent selected from the group consisting of mineral acids and water and separating the thus precipitated form of chlortetracycline.

4. A method for the purification of chlortetracycline which comprises the steps of bringing about the solution of the crude chlortetracycline-containing material in a hydroxylated organic solvent by the addition of ammonia, separating insoluble impurities, adding thereto hydrochloric acid whereby the chlortetracycline is caused to precipitate as its hydrochloride, and separating the thus formed chlortetracycline hydrochloride.

5. A method for the purification of chlortetracycline which comprises the steps of bringing about the solution of a crude chlortetracycline hydrochloride in a lower straight chain alcohol solvent by the addition of triethylamine, separating insoluble impurities, adding hydrochloric acid to the solution, and separating the thus formed chlortetracycline hydrochloride.

6. A method for the purification of chlortetracycline which comprises the steps of bringing about the solution of a crude chlortetracycline hydrochloride in a lower straight chain alcohol solvent by the addition of ammonia, separating insoluble impurities, precipitating chlortetracycline as its hydrochloride by the addition of hydrochloric acid to the solution, and separating the thus formed chlortetracycline hydrochloride.

7. The method of preparing chlortetracycline hydrochloride in a comparatively pure form which comprises the steps of bringing about the solution of crude chlortetracycline hydrochloride in a hydroxylated organic solvent by the addition of an organic mono-amine; separating any insoluble impurities, adding hydrochloric acid thereto to induce precipitation of the chlortetracycline as its hydrochloride; and separating the thus formed chlortetracycline hydrochloride.

8. The method of preparing chlortetracycline hydrochloride in a comparatively pure form which comprises the steps of bringing about the solution of crude chlortetracycline hydrochloride in a hydroxylated organic solvent by the addition of ammonia; separating insoluble impurities, adding hydrochloric acid thereto to induce precipitation of the chlortetracycline as its hydrochloride; and separating the thus formed chlortetracycline hydrochloride.

9. The method of preparing chlortetracycline hydrochloride in a comparatively pure form which comprises the steps of bringing about the solution of crude chlortetracycline hydrochloride in ethanol by the addition of an organic amine; separating any insoluble impurities, adding hydrochloric acid thereto to induce precipitation of the chlortetracycline as its hydrochloride; and separating the thus formed chlortetracycline hydrochloride.

10. The method of preparing chlortetracycline hydrochloride in a comparatively pure form which comprises the steps of bringing about the solution of crude chlortetracycline hydrochloride in ethanol by the addition of ammonia; separating any insoluble impurities, adding hydrochloric acid thereto to induce precipitation of the chlortetracycline as its hydrochloride; and separating the thus formed chlortetracycline hydrochloride.

11. The method of preparing chlortetracycline hydrochloride in a comparatively pure form which comprises the steps of bringing about the solution of crude chlortetracycline hydrochloride in ethoxyethanol by the addition of an organic mono-amine; separating insoluble impurities, adding hydrochloric acid thereto to induce precipitation of the chlortetracycline as its hydrochloride; and separating the thus formed chlortetracycline hydrochloride.

12. The method of preparing chlortetracycline hydrochloride in a comparatively pure form which comprises the steps of bringing about the solution of crude chlortetracycline hydrochloride in 2-ethoxyethanol by the addition of ammonia; separating any insoluble impurities, adding hydrochloric acid thereto to induce precipitation of the chlortetracycline as its hydrochloride; and separating the thus formed chlortetracycline hydrochloride.

13. The method of preparing chlortetracycline hydrochloride in a comparatively pure form which comprises the steps of bringing about the solution of crude chlortetracycline hydrochloride in methanol by the addition of an organic amine; separating insoluble impurities, adding hydrochloric acid thereto to induce precipitation of the chlortetracycline as its hydrochloride; and separating the thus formed chlortetracycline hydrochloride.

14. The method of preparing chlortetracycline hydrochloride in a comparatively pure form which comprises the steps of bringing about the solution of crude chlortetracycline hydrochloride in methanol by the addition of ammonia; separating any insoluble impurities, adding hydrochloric acid thereto to induce precipitation of the chlortetracycline as its hydrochloride; and separating the thus formed chlortetracycline hydrochloride.

15. A method for the purification of chlortetracycline which comprises the steps of bringing about the solution of the crude chlortetracycline-containing material in an alkoxy ethanol by adjusting the pH to within the range of approximately 8 to 10, separating any insoluble impurities and recovering the chlortetracycline in the form of its hydrochloride by addition thereto of sufficient hydrochloric acid to lower the pH to less than 3.0 and recovering the thus precipitated chlortetracycline as its hydrochloride salt.

16. The method of purifying chlortetracycline hydrochloride which comprises the steps of bringing about the solution of a crude chlortetracycline hydrochloride in ethoxyethanol by the addition of triethylamine; separating insoluble impurities, adding hydrochloric acid thereto to induce precipitation of the chlortetracycline as its hydrochloride; and separating the thus formed chlortetracycline hydrochloride.

17. A method for the purification of chlortetracycline which comprises dissolving a crude chlortetracycline and a nitrogenous base having an ionization constant of $10^{-7}$ or greater in an organic solvent containing alcohol linkages, separating any insoluble material, precipitating the chlortetracycline as a mineral acid salt by the addition of a mineral acid, and separating the thus precipitated mineral acid salt of chlortetracycline.

18. A method for the purification of chlortetracycline which comprises dissolving a crude chlortetracycline and a basic compound selected from the group consisting of ammonia, triethylamine, ethanolamine, di-n-butylamine and morpholine in a solvent selected form the group consisting of lower alkanols, lower-alkoxy-lower alkanols, methyl carbitol, ethylene chlorhydrin, propylene chlorhydrin, dioxane, ethylene glycol, benzyl alcohol, nitromethane, diacetone alcohol, acetophenone, and a lower fatty acid ester of a lower-alkoxy-lower-alkanol, separating any insoluble material, adding to the clarified solution a mineral acid, whereby the chlortetracycline is recovered as a mineral acid salt, and separating the thus formed mineral acid salt of chlortetracycline.

ROBERT WINTERBOTTOM.
PETER EICHLER.
CHARLES PIDACKS.

References Cited in the file of this patent
UNITED STATES PATENTS

| Number | Name | Date |
|---|---|---|
| 2,482,055 | Duggar | Sept. 13, 1949 |
| 2,516,080 | Sobin | July 18, 1950 |

OTHER REFERENCES

Rivett on Streptolin in J. Am. Chem. Soc., vol. 69, Dec. 1947, pp. 3006–3009.
Pratt, "Antibiotics," 1949, pp. 160, 161.